Aug. 29, 1961 J. M. SIPRESS 2,998,580

ACTIVE MULTIPORT NETWORK

Filed July 29, 1960

INVENTOR
J. M. SIPRESS
BY
Ralph T. Holcomb
ATTORNEY

United States Patent Office 2,998,580

Patented Aug. 29, 1961

2,998,580

ACTIVE MULTIPORT NETWORK

Jack M. Sipress, Summit, N.J., assignor to Bell Telephone Laboratories, Incorporated, New York, N.Y., a corporation of New York Filed July 29, 1960, Ser. No. 46,285

7 Claims. (Cl. 333—80)

Figure 1:
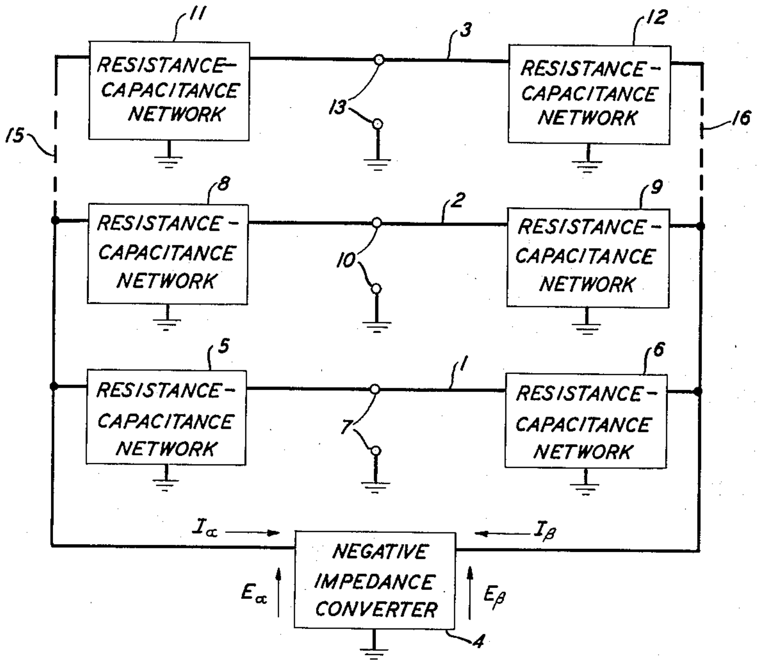

This invention relates to wave transmission networks and more particularly to an active *n*-port network without inductors in which *n* of the short-circuit admittance parameters may be preselected without restriction.

An object of the invention is to obtain *n* unrestricted short-circuit admittance parameters in an *n*-port network which requires no inductors, where *n* is greater than one. A further object is to obtain these parameters in a network which may be grounded on one side.

Networks comprising resistors and capacitors but requiring no inductors are called RC networks. Two-port, active, RC networks are known in which only one unrestricted transfer function, such as a short-circuit transfer admittance, may be obtained. In such structures, the transfer function may be specified but not the driving-point functions. However, it is often desirable to be able to specify the short-circuit driving-point function at a port in order to reduce reflection effects. In addition, it is often desirable to be able to specify several short-circuit transfer admittances or driving-point functions in a multiport network. Also, in some circumstances it is advantageous to be able to ground one side of the structure. This permits the use of unbalanced component networks, with a consequent saving of elements. It also permits allowing for certain stray capacitances to ground, thus improving the performance.

The multiport network with *n* ports in accordance with the present invention meets all of these requirements. It is an active network without inductors in which certain *n* of the short-circuit admittance parameters may be preselected without restriction. The network comprises a negative-impedance converter and *n* transmission paths connected in parallel between the ends thereof. Each of the paths includes two passive, two-port, component networks connected in tandem, with a common port therebetween. The converter and the component networks may be unbalanced, so that one side may be grounded.

The short-circuit admittances of the component networks are so selected, and the voltage transfer ratio $M_e$ and the current transfer ratio $M_i$ of the converter are so chosen, that certain *n* of the short-circuit admittance parameters of the *n*-port network may be preselected without restriction. As defined below, $M_e$ and $M_i$ must have the same sign. These unrestricted parameters are any *n* except that not more than one member of any column of the short-circuit admittance matrix that describes the *n*-port network may be preselected, if $M_e$ and $M_i$ are positive. If $M_e$ and $M_i$ are negative, then not more than one member of any row of this matrix may be preselected. Hence, for the important case of the two-port network, where *n* is two, any two of the four short-circuit admittance parameters may be preselected without restriction.

In order to get these unrestricted parameters, three special admittance relationships must apply as follows:

(1) With all *n* of the ports of the network short-circuited, the admittances looking in both directions at a port of the negative-impedance converter are equal in magnitude but opposite in sign at the frequencies of the poles of all of the selected short-circuit admittance parameters.

(2) With all *n* of the ports of the network short-circuited, the sum of the admittance looking into the near end of one of the two component passive networks facing a selected common port and the transfer admittance from the near end of the one network to the selected port is equal in magnitude but opposite in sign to the sum of the admittance looking into the near end of the other network facing the selected port and the transfer admittance from the near end of the said other network to the selected port, at the frequencies of the zeroes of the driving-point admittance at the selected port.

(3) At the frequencies of the zeroes of the short-circuit transfer admittance from a first common port to a second common port the product of the short-circuit transfer admittance from the first common port to a port of the converter and the short-circuit transfer admittance from a port of the converter to the second common port is equal to zero.

Figure 2:
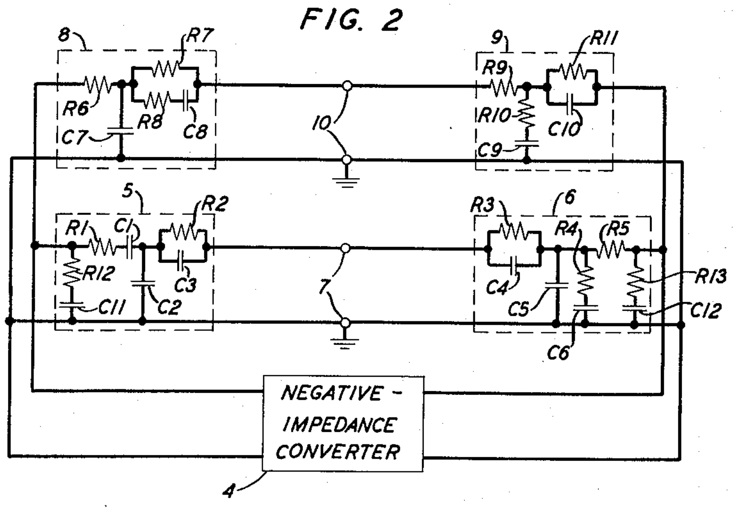

The nature of the invention and its various objects, features, and advantages will appear more fully in the following detailed description of a typical embodiment illustrated in the accompanying drawing, of which:

FIG. 1 is a block diagram of an unbalanced, active, *n*-port network in accordance with the invention; and FIG. 2 is a schematic circuit of an embodiment of the network of FIG. 1.

In FIG. 1, an active two-port, three-terminal, negative-impedance converter 4 has a plurality of transmission paths 1, 2, and 3 connected in parallel between its ends. Each of these paths includes two, two-port, three-terminal, passive, RC networks, connected in tandem, with an intervening common port. In the path 1, the networks are designated 5 and 6, and the port 7. In the path 2, the corresponding designations are 8, 9, and 10, and in the path 3 they are 11, 12, and 13. The broken lines 15 and 16 between the paths 2 and 3 indicate that more parallel transmission paths, similar to 1, 2, or 3, may be added if required. Since the converter 4 and the RC networks are unbalanced in form, they may be grounded on one side, as shown. Also, one terminal of each of the ports 7, 10, and 13 may be grounded.

The voltage transfer ratio $M_e$ of the converter 4 is the ratio of the voltage $E_\beta$ at the right end to the voltage $E_\alpha$ at the left end. The current transfer ratio $M_i$ is the ratio of the current $I_\beta$ to the current $I_\alpha$. The assumed directions of these voltages and currents are indicated by the arrows in FIG. 1.

As defined above, $M_e$ and $M_i$ must be of the same sign. Thus, there are two subordinate cases: (*a*) both positive or (*b*) both negative. For these cases, the relationship (3) stated above may be simplified as follows:

(3*a*) (Both $M_e$ and $M_i$ positive.) With the wire connecting the two passive networks at the first common port opened, the two short-circuit transfer admittances from the near ends of these two networks to a port of the converter are equal in magnitude but opposite in sign at the frequencies of the zeroes of the short-circuit transfer admittance from the first common port to the second common port.

(3*b*) (Both $M_e$ and $M_i$ negative.) With one end of the converter disconnected from the *n* paths, the short-circuit transfer admittances in both directions from the disconnected end of the converter to the second common port are equal in magnitude but opposite in sign at the frequencies of the zeroes of the short-circuit transfer admittance from the first common port to the second common port.

It will now be shown that the network of FIG. 1, with only two paths 1 and 2, can be used to realize any two of the four short-circuit admittance parameters of the active, RC network comprising ports 7 and 10 only. Analysis of the structure yields $$Y_{11}=y_{11a}+y_{11b}-\frac{(y_{12a}+M_e y_{12b})\left(y_{12a}-\frac{1}{M_i}y_{12b}\right)}{y_{33}-\frac{M_e}{M_i}y_{44}} \quad (1)$$

$$Y_{12}=-\frac{(y_{12a}+M_e y_{12b})\left(y_{12c}-\frac{1}{M_i}y_{12d}\right)}{y_{33}-\frac{M_e}{M_i}y_{44}} \quad (2)$$

$$Y_{21}=-\frac{\left(y_{12a}-\frac{1}{M_i}y_{12b}\right)(y_{12c}+M_e y_{12d})}{y_{33}-\frac{M_e}{M_i}y_{44}} \quad (3)$$

$$Y_{22}=y_{11c}+y_{11d}-\frac{(y_{12c}+M_e y_{12d})\left(y_{12c}-\frac{1}{M_i}y_{12d}\right)}{y_{33}-\frac{M_e}{M_i}y_{44}} \quad (4)$$

where $$y_{33}=y_{22a}+y_{22c} \quad (5)$$

$$y_{44}=y_{22b}+y_{22d} \quad (6)$$

$y_{11a}$ and $y_{22a}$ are the short-circuit driving-point admittances at the right and left ports, respectively, of the network 5; $y_{11b}$ and $y_{22b}$ are the short-circuit driving-point admittances at the left and right ports, respectively, of the network 6; $y_{11c}$ and $y_{22c}$ are the short-circuit driving-point admittances at the right and left ports, respectively, of the network 8; $y_{11d}$ and $y_{22d}$ are the short-circuit driving-point admittances at the left and right ports, respectively, of the network 9; $y_{12a}$, $y_{12b}$, $y_{12c}$, and $y_{12d}$ are the short-circuit transfer admittances of the networks 5, 6, 8, and 9, respectively; $Y_{11}$ and $Y_{22}$ are the short-circuit driving-point admittances at the ports 7 and 10, respectively; $Y_{12}$ is the short-circuit transfer admittance from port 10 to port 7; and $Y_{21}$ is the short-circuit transfer admittance from port 7 to port 10.

The three special admittance relationships given above, which apply to any number of paths, are based upon Equations 1, 2, 3, and 4.

Assume the two parameters are specified as $$N_1'(p)/D_1(p)$$

and $N_2'(p)/D_2(p)$ where $N_1'(p)$, $N_2'(p)$, $D_1(p)$ and $D_2(p)$ are arbitrary polynomials in the complex frequency variable $p$, with real coefficients. First, we make the denominator polynomials identical by multiplying both of the parameters by suitable surplus factors. Denoting the new numerator polynomials as $N_1$ and $N_2$, respectively, and the common denominator as D, we have $$\frac{N_1'}{D_1}=\frac{N_1'F_1}{D_1F_1}=\frac{N_1}{D} \quad (7)$$

$$\frac{N_2'}{D_2}=\frac{N_2'F_2}{D_2F_2}=\frac{N_2}{D} \quad (8)$$

The various parameters in (1) will now be identified. There are four distinct cases to consider.

(1) A short-circuit driving-point admittance and the forward short-circuit transfer admittance are simultaneously specified, for example, $Y_{11}$ and $Y_{21}$.

(2) A short-circuit driving-point admittance and the reverse short-circuit transfer admittance are simultaneously specified, for example, $Y_{11}$ and $Y_{12}$.

(3) The two short-circuit driving-point admittances $Y_{11}$ and $Y_{22}$ are simultaneously specified.

(4) The two short-circuit transfer admittances $Y_{12}$ and $Y_{21}$ are simultaneously specified.

Consider case 1. Here $M_e$ and $M_i$ are required to be negative. Let $$Y_{11}(p)=N_1/D \quad (9)$$

$$Y_{21}(p)=N_2/D \quad (10)$$

The initial steps are the same as those covered by Equations 1 through 14 of my copending application, Serial Number 46,284, filed on July 29, 1960, with the following differences: $Y(p)$ is replaced by $Y_{11}(p)$, hence, N is replaced by $N_1$; $m$ is now chosen equal to or greater than the degree of $N_1$, $N_2$, and D; $y_{22a}$ is replaced by $y_{33}$; and $y_{22b}$ is replaced by $y_{44}$. Therefore, corresponding to Equations 12, 13, 9, 10, 11 of the above-mentioned application, we have the following equations, respectively:

$$y_{11a}=K_{1a}A_a/B \quad (11)$$

$$y_{11b}=K_{1b}A_b/B \quad (12)$$

$$y_{12a}=-K_3U_a/B \quad (13)$$

$$y_{12b}=-K_3U_b/B \quad (14)$$

$$y_{33}-\frac{M_e}{M_i}y_{44}=K_2K_3^2D/B \quad (15)$$

Hence, substitution into (3) yields $$\frac{N_2}{D}=-[y_{12c}+M_e y_{12d}]\left[\frac{-K_3(U_a-U_b/M_i)/B}{K_2K_3^2D/B}\right] \quad (16)$$

Substitution of (5*b*) of my above-mentioned application into (16) above gives $$y_{12c}+M_e y_{12d}=K_3N_2/U \quad (17)$$

Suitable expressions for $y_{12c}$ and $y_{12d}$ may now be determined. One possibility is to expand $K_3N_2/pU$ in partial fractions. The sum of the terms with positive residues can be identified as $-y_{12c}/p$ while the sum of the terms with negative residues can be identified as $$-M_e y_{12d}/p$$

In this way, the networks 8 and 9 can be made to take the form of series-connected, two-terminal admittance branches.

Next, choose the value of $K_3$ such that $y_{11a}$ and $y_{12a}$, given by (11) and (13), respectively, and $y_{11b}$ and $y_{12b}$, given by (12) and (14), respectively, can be realized in ladder-type structures. Synthesize these two structures and the networks 8 and 9 without regard for the resulting $y_{22}$'s, which shall be denoted $y_{22a}'$, $y_{22b}'$, $y_{22c}$ and $y_{22d}$, respectively. Let $$y_{22a}=y_{22a}'+y_3 \quad (18)$$

$$y_{22b}=y_{22b}'+y_4 \quad (19)$$

where $y_3$ and $y_4$ are each two-terminal, RC admittances. Hence, $$y_{22a}'+y_3+y_{22c}-\frac{M_e}{M_i}(y_{22b}'+y_4+y_{22d})=K_2K_3^2D/B \quad (20)$$

The admittances $y_3$ and $y_4$ can be determined from (20) in a similar manner to that used in the above-mentioned application to determine $y_3$ and $y_4$ from (17) therein.

Consider case 2. Here $M_e$ and $M_i$ are required to be positive. The procedure for identification in this case is exactly analogous to that used for case 1 above.

Consider case 3. Here $M_e$ and $M_i$ can be positive or negative. Let $$Y_{11}(p)=N_1/D \quad (21)$$

$$Y_{22}(p)=N_2/D \quad (22)$$

The method of identifying and realizing the various RC short-circuit admittance parameters closely parallels the technique described in the above-mentioned application. Let $m$ be equal to, or greater than, the degree of each of the three polynomials $N_1$, $N_2$, and D. Arbitrarily choose $$y_{11a}+y_{11b}=K_1'A_1/A \quad (23)$$

$$y_{11c}+y_{11d}=K_1''A_2/B \quad (24)$$

where $K_1'A_1/B$ and $K_1''A_2/B$ each separately satisfy the same conditions that are satisfied by $K_1A/B$ of (2) in the above-mentioned application. Hence, $$\frac{(y_{12a}+M_e y_{12b})\left(y_{12a}-\frac{1}{M_i}y_{12b}\right)}{y_{33}-\frac{M_e}{M_i}y_{44}}=\frac{K_1'A_1D-N_1B}{BD}=\frac{U_1V_1}{BD} \qquad (25)$$

$$\frac{(y_{12c}+M_e y_{12d})\left(y_{12c}-\frac{1}{M_i}y_{12d}\right)}{y_{33}-\frac{M_e}{M_i}y_{44}}=\frac{K_1''A_2D-N_2B}{BD}=\frac{U_2V_2}{BD} \qquad (26)$$

where $U_1$ and $U_2$ each separately satisfy the same conditions that are satisfied by U of (4) in the above-mentioned application, and $V_1$ and $V_2$ each separately satisfy the same conditions that are satisfied by V of the same equation.

For a converter in which $M_e$ and $M_i$ are both positive, let $$K_2'U_1=U_a+M_eU_b \qquad (27)$$
$$V_1=U_a-U_b/M_i \qquad (28)$$
$$K_2''U_2=U_c+M_eU_d \qquad (29)$$
$$V_2=U_c-U_d/M_i \qquad (30)$$

For $M_e$ and $M_i$ both negative, let $$K_2'U_1=U_a-U_b/M_i \qquad (31)$$
$$V_1=U_a+M_eU_b \qquad (32)$$
$$K_2''U_2=U_c-U_d/M_i \qquad (33)$$
$$V_2=U_c+M_eU_d \qquad (34)$$

In the above, $K_2'$ and $K_2''$ are, as yet, undetermined positive constants. Therefore, for $M_e$ and $M_i$ positive, $$U_a=\frac{K_2'U_1/M_i+M_eV_1}{M_e+1/M_i} \qquad (35)$$

$$U_b=\frac{K_2'U_1-V_1}{M_e+1/M_i} \qquad (36)$$

$$U_c=\frac{K_2''U_2/M_i+M_eV_2}{M_e+1/M_i} \qquad (37)$$

$$U_d=\frac{K_2''U_2-V_2}{M_e+1/M_i} \qquad (38)$$

Similarly, for $M_e$ and $M_i$ negative, $$U_a=\frac{M_eK_2'U_1+V_1/M_i}{M_e+1/M_i} \qquad (39)$$

$$U_b=\frac{-K_2'U_1+V_1}{M_e+1/M_i} \qquad (40)$$

$$U_c=\frac{M_eK_2''U_2+V_2/M_i}{M_e+1/M_i} \qquad (41)$$

$$U_d=\frac{-K_2''U_2+V_2}{M_e+1/M_i} \qquad (42)$$

It follows from root-loci considerations that for large enough values of $K_2'$ and $K_2''$, for both types of converters, $U_a$, $U_b$, $U_c$, and $U_d$ each have the same properties as those of $U_a$ and $U_b$ of (7) and (8) of the above-mentioned application. As a result, and due to the properties of B, identify $$y_{12a}=-K_3'U_a/B \qquad (43)$$
$$y_{12b}=K_3'U_b/B \qquad (44)$$
$$y_{12c}=-K_3''U_c/B \qquad (45)$$
$$y_{12d}=-K_3''U_d/B \qquad (46)$$

where $K_3'$ and $K_3''$ are, as yet, undetermined positive constants. However, if these constants are chosen such that $$K_2'K_3'^2=K_2''K_3''^2 \qquad (47)$$

then also identify $$y_{33}-\frac{M_e}{M_i}y_{44}=K_2'K_3'^2D/B=K_2''K_3''^2D/B \qquad (48)$$

The constants $K_3'$ and $K_3''$ can be chosen to satisfy (47) in the following manner. Write $$y_{11a}=K_{1a}'A_{1a}/B \qquad (49)$$
$$y_{11b}=K_{1b}'A_{1b}/B \qquad (50)$$
$$y_{11c}=K_{1c}''A_{2c}/B \qquad (51)$$
$$y_{11d}=K_{1d}''A_{2d}/B \qquad (52)$$

where the quantities on the right-hand sides of (49) through (52) each have the form of RC driving-point admittance functions; $A_{1a}(0)$, $A_{1b}(0)$, $A_{2c}(0)$, and $A_{2d}(0)$ are each not equal to zero; and $$K_{1a}'A_{1a}+K_{1b}'A_{1b}=K_1'A_1 \qquad (53)$$
$$K_{1c}''A_{2c}+K_{1d}''A_{2d}=K_1''A_2 \qquad (54)$$

Then, determine the largest value of $K_3'$ such that $y_{12a}$ and $y_{11a}$, given by (43 and (49), respectively, and $y_{12b}$ and $y_{11b}$, given by (44) and (50), respectively, can be realized in ladder-type structures. Denote this value by $K_{30}'$. Also, determine the largest value of $K_3''$ such that $y_{12c}$ and $y_{11c}$, given by (45) and (51), respectively, and $y_{12d}$ and $y_{11d}$, given by (46) and (52), respectively, can be realized in ladder-type structures. Denote this value by $K_{30}''$. Choose the actual values of $K_3'$ and $K_3''$ for use in (43) through (46) such that (47) is satisfied and $$K_3'\leqq K_{30}' \qquad (55)$$
$$K_3''\leqq K_{30}'' \qquad (56)$$

Synthesize the four ladder-type structures without regard for the resulting $y_{22}$'s, which, as before, shall be denoted by $y_{22a}'$, $y_{22b}'$, $y_{22c}$, and $y_{22d}$, respectively. Let $y_{22a}$ and $y_{22b}$ be as given by (18) and (19), respectively. Hence, $$y_{22a}'+y_3+y_{22c}-\frac{M_e}{M_i}(y_{22b}'+y_4+y_{22d})=K_2'K_3'^2D/B-K_2''K_3''^2D/B \qquad (57)$$

from which $y_3$ and $y_4$ can be determined in the usual manner.

Consider case 4. Here $M_e$ and $M_i$ can be positive or negative. Let $$Y_{12}(p)=N_1/D \qquad (58)$$
$$Y_{21}(p)=N_2/D \qquad (59)$$

Let $m$ be equal to, or greater than, the degree of each of the three polynomials $N_1$, $N_2$ and D. Write $$\frac{(y_{12a}+M_e y_{12b})\left(y_{12c}-\frac{1}{M_i}y_{12d}\right)}{y_{33}-\frac{M_e}{M_i}y_{44}}=-\frac{BN_1}{BD} \qquad (60)$$

$$\frac{\left(y_{12a}-\frac{1}{M_i}y_{12b}\right)(y_{12c}+M_e y_{12d})}{y_{33}-\frac{M_e}{M_i}y_{44}}=-\frac{BN_2}{BD} \qquad (61)$$

where B has only distinct negative real roots, is of degree $m$, and has a positive leading coefficient. For $M_e$ and $M_i$ positive, $$K_2B=U_a+M_eU_b=U_c+M_eU_d \qquad (62)$$
$$-N_1=U_c-U_d/M_i \qquad (63)$$
$$-N_2=U_a-U_b/M_i \qquad (64)$$

For $M_e$ and $M_i$ negative, $$K_2B=U_a-U_b/M_i=U_c-U_dM_i \qquad (65)$$
$$-N_1=U_a+M_eU_b \qquad (66)$$
$$-N_2=U_c+M_eU_d \qquad (67)$$

In the above, $K_2$ is, as yet, an undetermined positive constant. Therefore, for $M_e$ and $M_i$ positive, $$U_a=\frac{K_2B/M_i-M_eN_2}{M_e+1/M_i} \qquad (68)$$

$$U_b=\frac{K_2B+N_2}{M_e+1/M_i} \quad (69)$$

$$U_c=\frac{K_2B/M_i-M_eN_1}{M_e+1/M_i} \quad (70)$$

$$U_d=\frac{K_2B+N_1}{M_e+1/M_i} \quad (71)$$

Similarly, for $M_e$ and $M_i$ negative, $$U_a=\frac{M_eK_2B-N_1/M_i}{M_e+1/M_i} \quad (72)$$

$$U_b=\frac{-K_2B-N_1}{M_e+1/M_i} \quad (73)$$

$$U_c=\frac{M_eK_2B-N_2/M_i}{M_e+1/M_i} \quad (74)$$

$$U_d=\frac{-K_2B-N_2}{M_e+1/M_i} \quad (75)$$

For a large enough value of $K_2$, it follows from root-loci considerations and the properties of B, $N_1$, and $N_2$ that, for both types of converters, $U_a$, $U_b$, $U_c$ and $U_d$ will all have only negative real roots, be of degree m, and have positive leading coefficients. Hence, identify $$y_{12a}=-U_a/B \quad (76)$$
$$y_{12b}=-U_b/B \quad (77)$$
$$y_{12c}=-U_c/B \quad (78)$$
$$y_{12d}=-U_d/B \quad (79)$$

$$y_{33}-\frac{M_e}{M_i}y_{44}=K_2D/B \quad (80)$$

Synthesize $y_{12a}$, $y_{12b}$, $y_{12c}$, and $y_{12d}$ in ladder-type structures without regard for the resulting $y_{11}$'s and $y_{22}$'s. Denote the $y_{22}$'s as $y_{22a}'$, $y_{22b}'$, $y_{22c}$ and $y_{22d}$, respectively. Let $y_{22a}$ and $y_{22b}$ be as given by (18) and (19), respectively. Hence, $$y_{22a}'+y_3+y_{22c}-\frac{M_e}{M_i}(y_{22b}'+y_4+y_{22d})=K_2D/B \quad (81)$$

from which $y_3$ and $y_4$ can be determined in the usual manner.

Let us now consider the general case, where $n$ is greater than 2. Assume that $M_e$ and $M_i$ of the converter 4 are both positive (negative). With the restriction that there not be more than one entry in any column (row), specify $n$ terms of the $n$-by-$n$ short-circuit admittance matrix that describes the network of FIG. 1 as $$Y_{jk}=N_{jk}'/D_{jk} \quad (82)$$

Multiply the specified parameters by suitable surplus factors so as to make the $n$ polynomials identical, that is, $$Y_{jk}=N_{jk}'F_{jk}/D_{jk}F_{jk}=N_{jk}/D \quad (83)$$

The parameters of the RC networks of FIG. 1 can be identified as follows:

(1) Let $r$ denote the set of terminals, if any, for which the over-all short-circuit admittance parameters, $Y_{rr}$, have been specified. Identify the parameters of the two RC networks connected to each of the $r$ terminals, to within the arbitrary positive constant $K_3^r$, in a similar manner to that of case 3 above. In the present instance, $m$ is equal to, or greater than, the greatest degree of D and all the $N_{jk}$'s.

(2) Let $s$ denote the set of terminals, if any, for which there is a specified over-all short-circuit transfer admittance to (from) one of the terminals $r$, that is, $Y_{rs}$ ($Y_{sr}$). Identify the parameters of the two RC networks connected to each of the $s$ terminals, in a similar manner to that of case 2 (case 1) above.

(3) Let $t$ denote the set of terminals, if any, for which there is a specified over-all short-circuit transfer admittance to (from) one of the terminals $s$, that is, $Y_{st}$ ($Y_{ts}$). Repeat the procedure of step 2 for each of the terminals $t$.

(4) Repeat step 3 until all of the remaining specified over-all transfer parameters, if any, are associated with terminals for which the connecting RC networks have, as yet, not been identified.

(5) Consider all of the remaining specified over-all short-circuit transfer admittances. With $m$ as in step 1, identify the parameters of the RC networks connected to the remaining terminals, to within the arbitrary positive costant $K_3^j$, in a similar manner to that of case 4, above.

(6) In all of the above, $$y_{\alpha\alpha}-\frac{M_e}{M_i}y_{\beta\beta}$$

the expression whose zeroes are the over-all network poles, is of the form $KD/B$ where B has only negative real roots, is of degree $m$, and has a positive leading coefficient; and, K is some arbitrary positive constant. Hence, select the value of K, that is, $K_3^r$ and $K_3^j$, so that the restrictions analogous to those of (47), (55), and (56) are satisfied, and then proceed in the usual manner.

As an example of the simultaneous realization of two transfer functions, consider the synthesis of $$Y_{12}=-\frac{p^2}{p^2+2p+2}$$

$$Y_{21}=-\frac{2}{p^2+2p+2}$$

Choose a converter with $M_e=M_i=1$. With $N_1=p^2$ and $N_2=2$, the choice of $B=(p+4)(p+½)$ and $K_2=1$ yields from (68), (69), (70), and (71)

$$U_a=p(p+4.5)/2$$
$$U_b=(p_2+4.5p+4)/2=(p+3.281)(p+1.219)/2$$
$$U_c=2.25p+1$$
$$U_d=p^2+2.5p+1=(p+1.640)(p+0.610)$$

Substitution into (76), (77), (78), and (79) yields expressions for the short-circuit transfer admittances $y_{12a}$, $y_{12b}$, $y_{12c}$, and $y_{12d}$, from which the networks 8 and 9 and portions of the networks 5 and 6 may be synthesized as shown in FIG. 2. This portion of the network 5 comprises two resistors R1 and R2, and three capacitors, C1, C2, and C3. The portion of the network 6 is constituted by R3, R4, R5, C4, C5, and C6. The network 8 may be realized by the elements R6, R7, R8, C7, and C8, and the network 9 by R9, R10, R11, C9, and C10, arranged in the ladder-type configurations shown.

The driving-point admittances of the networks 5, 6, 8, and 9 are found to be as follows:

$$y_{22a}'=2.25p(p+1)/B$$
$$y_{22b}'=2(p^2+4.195p+1)/B$$
$$y_{22c}=(1.167p^2+4.853p+1)/B$$
$$y_{22d}=(1.373p^2+2.860p+1)/B$$

Substitution into (81), with $D=-(p^2+2p+2)$, gives expressions for the additional admittances required at the ends of the networks 5 and 6 remote from the port 7, as follows:

$$y_3=0.840p/(p+½)$$
$$y_4=1.884p/(p+4)$$

The admittance $y_3$ may be constituted by the elements R12 and C11, and $y_4$ by R13 and C12, connected as shown.

The transfer admittance $Y_{12}$ is obtained from the port 10 to the port 7, and $Y_{21}$ in the reverse direction.

In this example, the valuts of the resistors in ohms and the capacitors in farads are as follows:

| | |
|---|---|
| R1 | 0.444 |
| R2 | 0.667 |
| R3 | 0.500 |
| R4 | 0.250 |
| R5 | 0.500 |
| R6 | 0.857 |
| R7 | 1.143 |
| R8 | 0.327 |
| R9 | 1.000 |
| R10 | 2.688 |
| R11 | 1.000 |
| R12 | 1.190 |
| R13 | 0.531 |
| C1 | 1.125 |
| C2 | 1.167 |
| C3 | 0.333 |
| C4 | 1.640 |
| C5 | 4.921 |
| C6 | 1.219 |
| C7 | 2.042 |
| C8 | 1.531 |
| C9 | 0.610 |
| C10 | 0.610 |
| C11 | 1.680 |
| C12 | 0.471 |

It is to be understood that the above-described arrangement is only illustrative of the application of the principles of the invention. Numerous other arrangements may be devised by those skilled in the art without departing from the spirit and scope of the invention.

What is claimed is:

1. An active wave transmission network having $n$ ports where $n$ is greater than one comprising a three-terminal negative-impedance converter and $n$ transmission paths connected in parallel between the ends of the converter, each of the paths including two passive two-port, three-terminal, transmission networks connected in tandem and a common port therebetween, the passive networks comprising only resistors and capacitors, and the short-circuit admittances of the passive networks being so selected, and the voltage transfer ratio $M_e$ and the current transfer ratio $M_i$ of the converter being so chosen, that a certain $n$ of the short-circuit admittance parameters of the over-all network may be preselected without restriction.

2. A network in accordance with claim 1 in which $M_e$ and $M_i$ have the same sign.

3. A network in accordance with claim 2 in which $M_e$ and $M_i$ are both positive.

4. A network in accordance with claim 2 in which $M_e$ and $M_i$ are both negative.

5. An active wave transmission network having $n$ ports where $n$ is greater than one comprising a negative-impedance converter and $n$ transmission paths connected in parallel between the ends of the converter, each of the paths including two passive two-port, three-terminal, transmission networks connected in tandem and a common port therebetween, the passive networks comprising only resistors and capacitors, the converter having positive voltage and current transfer ratios, the short-circuit admittances of the passive networks being so selected that a certain $n$ of the short-circuit admittance parameters of the over-all network may be selected without restriction, and, when the connection between the two passive networks at a first selected common port is opened, the two short-circuit transfer admittances from the near ends of these two passive networks to a port of the converter being equal in magnitude but opposite in sign at the frequencies of the zeroes of the short-circuit transfer admittance from the first common port to a second selected common port.

6. An active wave transmission network having $n$ ports where $n$ is greater than one comprising a negative-impedance converter and $n$ transmission paths connected in parallel between the ends of the converter, each of the paths including two passive two-port, three-terminal, transmission networks connected in tandem and a common port therebetween, the passive networks comprising only resistors and capacitors, the converter having negative voltage and current transfer ratios, the short-circuit admittances of the passive networks being so selected that a certain $n$ of the short-circuit admittance parameters of the over-all network may be selected without restriction, and, when one end of the converter is disconnected from the $n$ paths, the short-circuit transfer admittances in both directions from the disconnected end of the converter to the second of two selected common ports are equal in magnitude but opposite in sign at the frequencies of the zeroes of the short-circuit transfer admittance from the first to the second of the selected common ports.

7. A network having a plurality $n$ of ports in which a certain selected $n$ of the short-circuit admittance parameters may be preselected without restriction comprising a negative-impedance converter and $n$ transmission paths connected in parallel between the ends of the converter, each of the paths including two passive two-port transmission networks connected in tandem and a common port therebetween, the passive networks comprising only resistors and capacitors, with all $n$ of the ports of the network short-circuited, the admittances looking in both directions at a port of the converter being equal in magnitude but opposite in sign at the frequencies of the poles of all of the selected parameters and the sum of the admittance looking into the near end of one of the two passive networks facing a selected common port and the transfer admittance from the near end of the one network to the selected port being equal in magnitude but opposite in sign to the sum of the admittance looking into the near end of the other network facing the selected port and the transfer admittance from the near end of the said other network to the selected port at the frequencies of the zeroes of the driving-point admittances at the selected port, and at the frequencies of the zeroes of the short-circuit transfer admittance from a first selected port to a second selected port the product of the short-circuit transfer admittance from the first selected port to a port of the converter and the short-circuit transfer admittance from a port of the converter to the second selected port being equal to zero.

No references cited